(12) United States Patent
Lee et al.

(10) Patent No.: US 7,989,582 B2
(45) Date of Patent: Aug. 2, 2011

(54) PROCESS FOR PRODUCING POLY-TETRAHYDROFURAN

(75) Inventors: Eun-Ku Lee, Gyeonggi-do (KR); Yong-Ho Baek, Gyeonggi-do (KR); Joon-Seok Oh, Seoul (KR); No-Hyun Kim, Gyeonggi-do (KR); Jae-Young Huh, Gyeonggi-do (KR)

(73) Assignee: Hyosung Corporation, Kyonggi-do (KR)

( * ) Notice: Subject to any disclaimer, the term of this patent is extended or adjusted under 35 U.S.C. 154(b) by 500 days.

(21) Appl. No.: 12/289,171

(22) Filed: Oct. 22, 2008

(65) Prior Publication Data
US 2009/0137776 A1     May 28, 2009

(30) Foreign Application Priority Data
Nov. 26, 2007 (KR) .................. 10-2007-0120923

(51) Int. Cl.
*C08G 65/20* (2006.01)
*C08G 65/06* (2006.01)
*C08G 65/02* (2006.01)
*C08G 65/04* (2006.01)
*C08G 59/68* (2006.01)

(52) U.S. Cl. ........ 528/408; 528/403; 528/482; 528/485; 528/499

(58) Field of Classification Search .................. 528/403, 528/408, 482, 485, 499
See application file for complete search history.

(56) References Cited

U.S. PATENT DOCUMENTS

| | | |
|---|---|---|
| 4,568,775 A | 2/1986 | Aoshima et al. |
| 4,658,065 A | 4/1987 | Aoshima et al. |
| 5,416,240 A | 5/1995 | Weyer et al. |
| 6,979,752 B1 | 12/2005 | Bertola et al. |

*Primary Examiner* — Duc Truong
(74) *Attorney, Agent, or Firm* — Nixon & Vanderhye P.C.

(57) ABSTRACT

The present invention relates to a process for producing tetrahydrofuran polymer or tetrahydrofuran copolymer by using heteropolyacid catalyst, and more particularly, to a process for producing tetrahydrofuran polymer by using hydronium ion water having a pH of 5.5 or less as a reaction initiator in the initiation step.

3 Claims, 1 Drawing Sheet

PROCESS FOR PRODUCING POLY-TETRAHYDROFURAN

TECHNICAL FIELD

The present invention relates to a process for producing poly-tetrahydrofuran (hereinafter referred to as "THF") by using hydronium ion water, and more particularly, to a process for producing poly-THF from THF alone or THF mixture by adding hydronium ion water as a reaction terminator and a reaction initiator in the presence of a heteropolyacid catalyst.

BACKGROUND ART

Polytetramethylene ether glycol (hereinafter referred to as "PTMG"), a typical kind of tetrahydrofuran polymer, is generally used as main materials of spandex, a plasticizer and an emulsifying agent due to its ductility. Poly-THF is prepared from THF, and especially, by using a heteropolyacid catalyst. For example, a process for preparing Poly-THF using heteropoly acid as a catalyst is disclosed in U.S. Pat. No. 4,568,775, No. 4,658,065 and No. 5,416,240. In comparison to the two-step process for preparing polymer from tetrahydrofuran (U.S. Pat. No. 6,979,752), only one-step process is provided by these inventions. However, this process leads to a low polymer yield.

A reaction mechanism for preparing polymers by using THF in the presence of acidic catalyst is also known (Catalyst Today 2002, 73, pp 29). THF polymerization reaction comprises three steps of Initiation, Propagation and Termination, and is divided into one-step reaction and two-step reaction depending on the kinds of reaction terminators. Commercially, a heteropoly acid is used in the one-step THF polymerization process, and in the reaction process, THF is changed into Oxonium ion in the presence of a catalyst, thereby serving as an initiator. Therefore, the more the concentration of the Oxonium ion is increased, the more active the polymerization reaction becomes, thereby resulting in a higher reaction yield. The process for producing Oxonium ion is already known (Solid State Ionics, 2001, 139, pp 281). In order to produce THF Oxonium ion, iodine ($I_2$) is added to produce iodine cation, which is then combined with oxygen to be converted into the THF oxonium ion. Such process for forming the THF oxonium ion leads to an assumption that the yield of the polymerization reaction would be increased by putting an additive that can be easily ionized into positive and negative ions, such as iodine ($I_2$), due to activated initiation step of the polymerization additives. However, elements like iodine ($I_2$) discolor the Poly-THF, thereby deteriorating properties of the Poly-THF, though they have an advantage of activating a polymerization reaction. Thus efforts have been made to develop an element that activates a polymerization reaction without changing the properties of the Poly-THF.

The hydronium ion ($H_3O^+$) allows positive ions to be formed easily, as the hydrogen ion is attached to the water molecule. And after the detachment of the hydrogen ion, remaining water is used as a reaction terminator of polymerization without any effect on polymers after the reaction. The inventors of the present invention have paid attention to this point to provide a method for increasing yield of the polymerization by adding hydronium ion as a reaction initiator in the initiation step.

The object of the present invention is to provide a method for improving THF polymerization yield by increasing concentration of the hydronium ion in water used as a reaction terminator when polymerizing THF in the presence of a heteropolyacid catalyst.

In order to achieve the above object, the present invention provides a process characterized in that: THF is used as a reactant in the presence of a heteropolyacid catalyst; and a reaction initiation step is activated by increasing concentration of the hydronium ion in water used as a reaction terminator.

Polymerization yield may be improved by producing Poly-THF according to the present invention, compared with the conventional method of adding only water as a reaction terminator.

DISCLOSURE OF THE INVENTION

According to the preferred embodiment of the present invention, a process for producing tetrahydrofuran polymer from THF in the presence of a heteropolyacid catalyst is provided, wherein hydronium ion water having a pH adjusted in the initiation step is used as a reaction initiator.

According to another preferred embodiment of the present invention, the pH is 5.5 or less.

According to another preferred embodiment of the present invention, the hydronium ion is prepared by using at least one solid acid selected from a group consisting of zeolite, silica-alumina and heteropoly acid.

Hereinafter the present invention will be described in further detail.

The present invention relates to a process for producing Poly-THF from THF by adding hydronium ion water as a reaction terminator in the presence of a heteropolyacid catalyst, thereby activating reaction initiation step.

FIG. 1 shows equipment 1 for producing Poly-THF used in the preparation process according to the present invention.

Tetrahydrofuran is firstly fed into a reactor 11. The THF used herein may be prepared from, e.g. 1,4-butane diol, but may be any form disclosed in this field. Tetrahydrofuran is fed into the reactor along with hydronium ion water. And heteropoly acid with adjusted coordination number of water is then added as a catalyst into the reactor. The coordination number of water in heteropoly acid may be adjusted to 3 to 18.

The catalyst used herein may preferably be heteropoly acid. Generally, heteropoly acid is coordinated with 20 to 40 water molecules, but this type of heteropoly acid is not effective in the polymerization reaction. Therefore, for an effective polymerization, the number of water molecules coordinated with heteropoly acid anion needs to be adjusted. To adjust the number of water molecules coordinated with heteropoly acid, heteropoly acid is, for example, heated at a temperature of 100 to 300° C. Heating temperature and time may be adjusted according to the coordination number of water molecules. Preferably, the number of water molecules coordinated with heteropoly acid is adjusted to 3 to 18 by heating at 120 to 180° C. for 3 to 6 hours.

As the polymerization reaction progresses, the amount of water in the catalyst may be reduced. Therefore, in order to make sure that a catalyst has a certain coordination number of water during a polymerization reaction, hydronium ion water may be added into the reactor 11 through an equipment for supplying hydronium ion water 13. In the case of the coordinated water molecules exceeding 20 or the mol ratio of hydronium ion water to heteropoly acid is below 0.1, the performance of polymerization reaction may deteriorate significantly. The added amount of hydronium ion water may be determined in accordance with the progress of polymerization reaction.

When heteropoly acid is introduced into the reactor, THF, water and heteropoly acid reaction compounds are stirred at a temperature of 40 to 80° C. for 2 to 6 hours. Afterwards, the reaction compounds are fed to a phase separation container 12, in which heteropoly acid layer and THF monomer layer of the reaction compounds are reacted homogeneously, thereby being separated into an upper layer and a lower layer. The upper layer is collected from the phase separation container 12, and unreacted THF monomer is removed through a distillation column 14, as a result, Poly-THF is obtained.

The heteropoly acid used herein may be oxy acids produced by bonding of at least one oxide selected from the group consisting of Mo (molybdenum), W (tungsten) and V (vanadium) to one condensate selected from the group consisting of P (phosphorus), As (arsenic), Ge (germanium), Ti (titanium), Ce (cesium) and Co (cobalt). The heteropoly acid used may be any of known heteropoly acids satisfying the above-mentioned conditions in the present invention. And heteropoly acid is preferred, though not limited, to have a following chemical formula (1). In particular, the heteropoly acid having the following chemical formula (1) is useful to prepare poly tetramethylene glycol and spandex.

$$Ha(X_bM_cO_d)\text{-}a \tag{1}$$

In the formula 1, "X" represents phosphorus, antimony, silicon or boron, and "M" represents molybdenum, tungsten or vanadium, and "O" represents oxygen, and "b, c and d" represent an atom ratio of each element, and "a" represents a value decided by valence of each element.

The "b" of the chemical formula (1) may be 1 to 5, preferably 1 to 2. The "c" of the chemical formula (1) may be 5 to 20, and "d" may be 18 to 62, preferably 40 to 62. The "a" of the chemical formula (1) means a negative charge of polyoxo anion and its value is changeable according to each condition, but always the same as the number of proton in order to keep the balance of the formula. Heteropoly acid and polyoxometalate have various structures, but among them, a heteropoly acid compound having a Keggin structure is useful to prepare poly-THF.

According to the present invention, hydronium ion may be produced by using an ion-exchange resin. The ion-exchange resin is preferred to be a strong acid cation resin that has a plurality of H+ cations and is easily dissociated in the water. The amount of cation resin used depends on an ion-exchanging capability of an ion-exchange resin. The ion-exchange resin used in the present invention may be sulfonated phenol aldehyde type resin or sulfonated polystyrene resin. Specifically, it is preferred to use Lewatit Monoplus resin of Lanxess and HCR—H resin of Dow Chemical as an ion-exchange resin. The hydronium ion water in the present invention is prepared by charging an ion-exchange resin column with the ion-exchange resin and then passing purified water therethrough.

A solid acid may be used instead to produce hydronium ion water in the present invention. A solid acid used may be zeolite, silica-alumina, heteropoly acid, etc. And hydronium ion is produced in the same manner as ion-exchange resin, by charging a column and passing purified water therethrough.

The concentration of the hydronium ion water is measured using pH meter. It is preferred that the hydronium ion water produced with ion-exchange resin has a pH of 5.5 or less. When pH of hydronium ion water exceeds 5.5, it does not affect the reaction, as the carbonate ion affects more greatly than the concentration of hydronium ion.

Hereinafter, the present invention will be described in detail with reference to Examples. These are provided only for the illustrative purpose, and it should not be construed the scope of the invention is limited thereto.

Preparation of Hydronium Ion Water

A vertical pyrex glass (5 cm in inside diameter, 100 cm in height) is charged with sulfonated phenol aldehyde type resin or sulfonated polystyrene resin. The hydronium ion water is prepared by passing purified water through the ion-exchange resin column at a rate of 20 ml/min.

Instead of the method using an ion-exchange resin, solid acids such as zeolite, silica-alumina, heteropoly acid and the like can be used in the same manner as above to produce the hydronium ion water. An aqueous solution treated with such an ion exchange resin column or solid acids is classified according to a pH value after measuring hydronium ion concentration with a pH meter.

EXAMPLE 1

2 kg of THF containing 300 ppm of water was fed into a 5 L reactor equipped with a stirrer and a reflux condenser. And then 1 kg of heteropoly acid was added thereto. Purified water was passed through Lewatit Monopolus S100H, an ion-exchange resin, to produce hydronium ion water having a pH of 3.8. 30 g of the hydronium ion water thus prepared was fed into the reactor. The temperature of the reactor was set at 60° C. After 4 hours of stirring, the hydronium ion water was left at a room temperature to be separated into an upper layer and a lower layer. Unreacted THF was removed from the upper layer by means of distillation, thereby obtaining polytetramethylene ether glycol (PTMG). Number average molecular weight (Mn), reaction conversion rate and hue (APHA) obtained by measuring an OH value of PTMG thus prepared are shown in table 1.

EXAMPLE 2

The process was carried out in the same manner as Example 1, except using HCH—H (Dow Chemical) as an ion exchange resin to prepare 30 g of hydronium ion water (pH 5.5) and then feeding it into the reactor.

EXAMPLE 3

The process was carried out in the same manner as Example 1, except using DOWEX MAC-3 as an ion exchange resin to prepare 30 g of hydronium ion water (pH 5.8) and then feeding it into the reactor.

EXAMPLE 4

The process was carried out in the same manner as Example 1, except using molybdenum phosphate as a heteropoly acid and using HCH—H (Dow Chemical) to prepare 30 g of hydronium ion water (pH 5.3) and then feeding it into the reactor.

EXAMPLE 5

The process was carried out in the same manner as Example 1, except using tungstosilicic acid as a heteropoly acid and using zeolite (ZSM-5) to prepare 30 g of hydronium ion water (pH 5.4) and then feeding it into the reactor.

COMPARATIVE EXAMPLE 1 TO 2

The process was carried out in the same manner as Example 1, except feeding any kinds of heteropoly acids and 30 g of purified water into the reactor.

TABLE 1

|  | Reaction conditions | | | PTMG | |
|---|---|---|---|---|---|
|  | Heteropoly acid | Ion exchange pH resins | Reaction conversion rate (%) | Number average molecular weight (Mn) | Hue (APHA) |
| Example 1 | Tungstophosphoric acid | 3.8 S100H | 26.5 | 1865 | 3 |
| Example 2 | Tungstophosphoric acid | 5.5 HCR-H | 23.0 | 1810 | 2 |
| Example 3 | Tungstophosphoric acid | 5.8 DOWEX MAC-3 | 18.4 | 1680 | 3 |
| Example 4 | Molybdenum phosphoric acid | 5.3 HCR-H | 22.5 | 1790 | 3 |
| Example 5 | Tungstosilicic acid | 5.4 Zeolite | 20.8 | 1795 | 3 |
| Comparative Example 1 | Tungstophosphoric acid | 6.5 | 15.5 | 1630 | 3 |
| Comparative Example 2 | Tungstosilicic acid | 6.4 | 13.3 | 1610 | 3 |

As shown in table 1, in the case of a pH value of 5.5 or less, the conversion rate of polytetramethylene glycol is improved.

Conversion rate and hue (APAH) are measured by the following method.

Measuring Conversion Rate

After polymerization reaction of THF, the mixture is left at a room temperature for 10 hours to thereby be separated into an upper layer and a lower layer. Only the upper layer is taken, and octane is added therein in a double amount of the upper layer, and then stirred at 30° C. for 5 hours. The catalyst is removed by a Teflon filter having an average diameter of 0.2 μm, and then concentrated by rotary vacuum evaporator to thereby obtain the PTMG. Conversion rate is obtained by measuring the weight of the PTMG.

Measuring Hue (APHA)

Using a Tintometer, Lovibond PFX 195, PTMG hue is measured by the American Public Health Association Color Scale (APHA) system.

Figure 1:
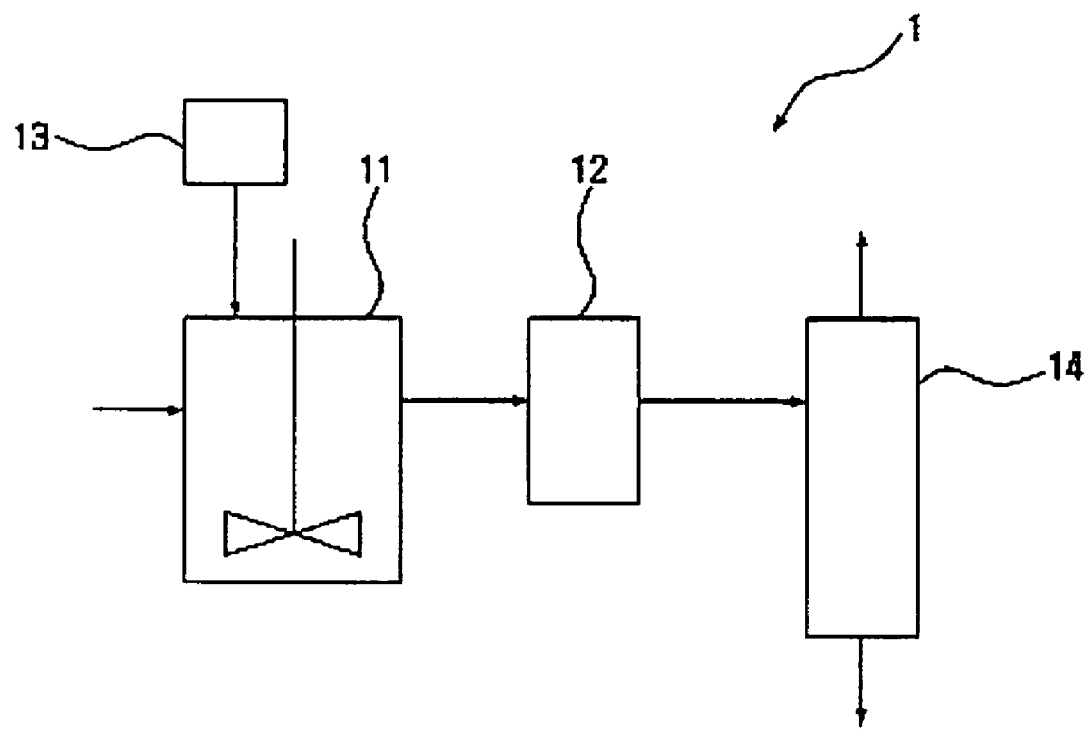
FIG. 1 is a schematic illustration showing a process for preparing tetrahydrofuran polymer according to the present invention.

The invention claimed is:

1. A process for producing tetrahydrofuran polymer from tetrahydrofuran in the presence of a heteropolyacid catalyst, wherein hydronium ion water having a pH adjusted in the initiation step is used as a reaction initiator.

2. The process for producing tetrahydrofuran polymer according to claim 1, wherein the pH is 5.5 or less.

3. The process for producing tetrahydrofuran polymer according to claim 1, wherein the hydronium ion water is prepared by using at least one solid acid selected from a group consisting of zeolite, silica-alumina and heteropoly acid.

* * * * *